United States Patent [19]

Bradham, III et al.

[11] 4,175,434
[45] Nov. 27, 1979

[54] COMPOUND METER ASSEMBLY

[75] Inventors: Allen C. Bradham, III; Edward A. Seruga, both of Milwaukee, Wis.

[73] Assignee: Badger Meter Inc., Milwaukee, Wis.

[21] Appl. No.: 897,189

[22] Filed: Apr. 17, 1978

Related U.S. Application Data

[62] Division of Ser. No. 746,536, Dec. 1, 1976, Pat. No. 4,100,799.

[51] Int. Cl.² ............................................. G01F 7/00
[52] U.S. Cl. ..................................................... 73/197
[58] Field of Search .......................................... 73/197

[56] References Cited

U.S. PATENT DOCUMENTS

| | | | |
|---|---|---|---|
| 1,209,700 | 12/1916 | Hanks | 73/197 |
| 1,577,731 | 3/1926 | Krueger | 73/197 X |
| 3,395,578 | 8/1968 | Simonds, Jr. | 73/197 |
| 3,616,814 | 11/1971 | Hendey | 73/197 X |
| 3,707,872 | 1/1973 | Masson et al. | 73/197 X |
| 3,972,233 | 8/1976 | Pelt et al. | 73/231 R |

*Primary Examiner*—Charles A. Ruehl
*Attorney, Agent, or Firm*—Neuman, Williams, Anderson & Olson

[57] ABSTRACT

A compound meter assembly is provided having primary and secondary passageways housing a high flow rate meter and a low flow rate meter, respectively. A flow responsive first valve is disposed within the secondary passageway and moves to a substantially closed position when the liquid flow is increasing through the secondary passageway and exceeds a first predetermined rate. Upon substantial closing of the first valve the liquid flow is diverted from the secondary passageway to the primary passageway. A pressure responsive second valve is disposed within the primary passageway and is held in a closed position with respect to the primary passageway while the pressure drop is below a first predetermined amount across the meter. The second valve is forced to an open position when a substantial pressure impulse is momentarily exerted on the second valve. The pressure impulse is created when the liquid flow is diverted from the secondary passageway by substantial closing of the first valve. The second valve remains open due to the liquid flow through the primary passageway until such time as the flow rate drops below a second predetermined amount. After the pressure impulse has dissipated, the first valve will open again after the second valve has moved to its opened position.

5 Claims, 11 Drawing Figures

RATE OF FLOWING GALLONS PER MINUTE 4,175,434

COMPOUND METER ASSEMBLY

This is a division of application Ser. No. 746,536, filed Dec. 1, 1976, now U.S. Pat. No. 4,100,799.

BACKGROUND OF THE INVENTION

Various meter assemblies of the type frequently referred to as compound meters have heretofore been provided for measuring variable flow rates within a piping system. Such assemblies, however, because of certain structural characteristics have been beset with one or more of the following shortcomings: the assembly is incapable of accurately measuring the flow rate where the latter varies over a wide range; the assembly is of bulky, costly and complex construction; the flow paths through the assembly are such that substantial pressure drops occur within the assembly; the assembly is susceptible to harmonic oscillation or chattering when measuring the liquid flow; and servicing of the assembly is a difficult and awkward operation requiring shut down of the assembly for long periods of time and oftentimes requiring removal of the entire assembly from the piping system.

SUMMARY OF THE INVENTION

It is an object of the invention to provide improved meter assemblies which avoid the aforenoted shortcomings.

It is a specific object of this invention to provide an improved compound meter capable of accurately measuring fluid flow over a wide range of flow rates.

It is a further object of the invention to provide a meter assembly which embodies a pair of meters, wherein the measurements obtained therefrom are constantly integrated thereby enabling the readings or data obtained from the assembly to be readily interpreted.

It is a further object of the invention to provide a meter assembly wherein various components thereof are contained within a single carriage which may be readily removed from and replaced in a housing component, while the latter remains in place within the piping system thereby markedly facilitating servicing, calibrating and repair of the assembly when required.

It is a still further object of the invention to provide a meter assembly wherein primary and secondary flow passageways are provided and the flow through the primary passageway is substantially straight line thereby minimizing pressure drop of the flow within the assembly.

Further and additional objects will appear from the description, accompanying drawings and appended claims.

In accordance with one embodiment, a meter assembly is provided which is adapted to accurately measure variable rates of liquid flow within a piping system. The assembly includes a housing having an inlet and an outlet which are suitably connected to the piping system. The housing has primary and secondary passageways formed therein which are in communication with the inlet and outlet. A first meter is disposed within the primary passageway and is adapted to accurately measure high rates of flow through the assembly. A second meter is disposed within the secondary passageway and is adapted to accurately measure low rates of flow through the assembly. Disposed within the secondary passageway is a flow responsive first valve which moves to a substantially closed or most restrictive position as the flow therethrough increases and exceeds a first predetermined rate. Upon the first valve assuming its substantially closed position a significant pressure impulse is momentarily developed within the assembly which is transmitted to a pressure responsive second valve, located in the primary passageway, causing the second valve to move to a fully open position whereby the liquid flow is substantially diverted from the secondary passageway to the primary passageway.

DESCRIPTION

For a more complete understanding of the invention reference should be made to the drawings wherein.

Figure 2:
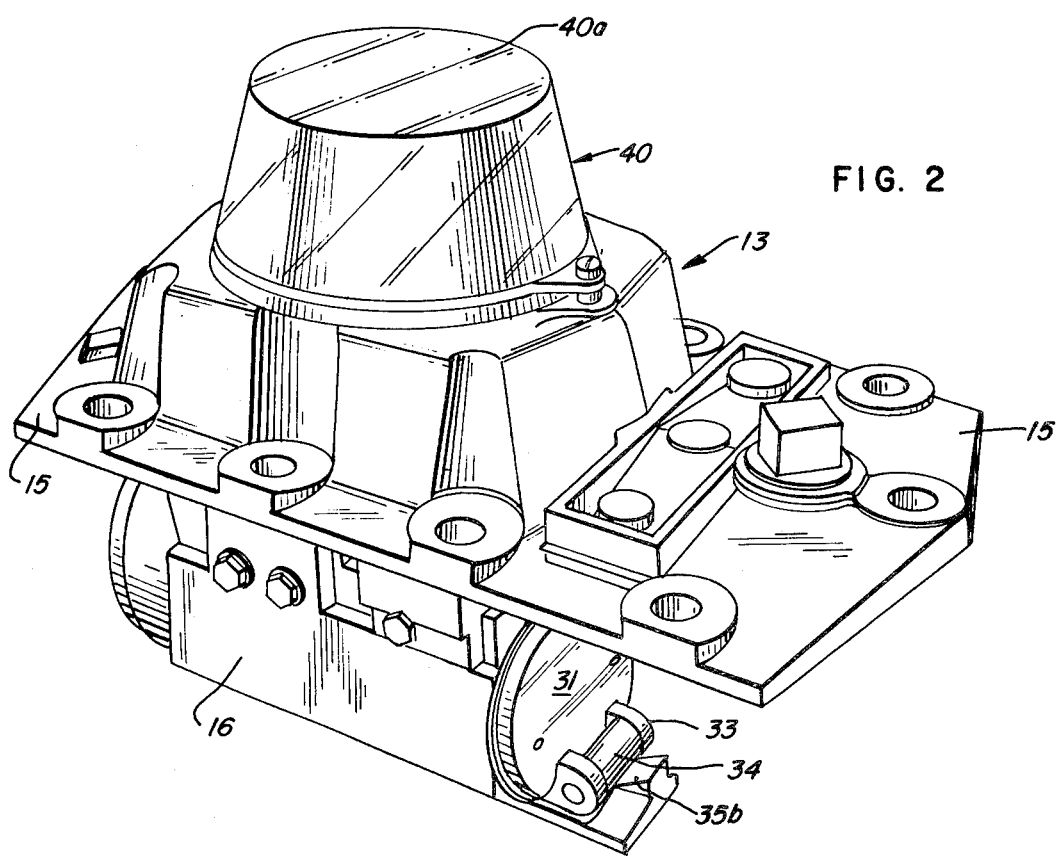
FIG. 2 is an enlarged perspective view similar to FIG. 1 but showing a section of the assembly removed from a housing section, the latter normally remaining connected to the piping system.
Figure 4:
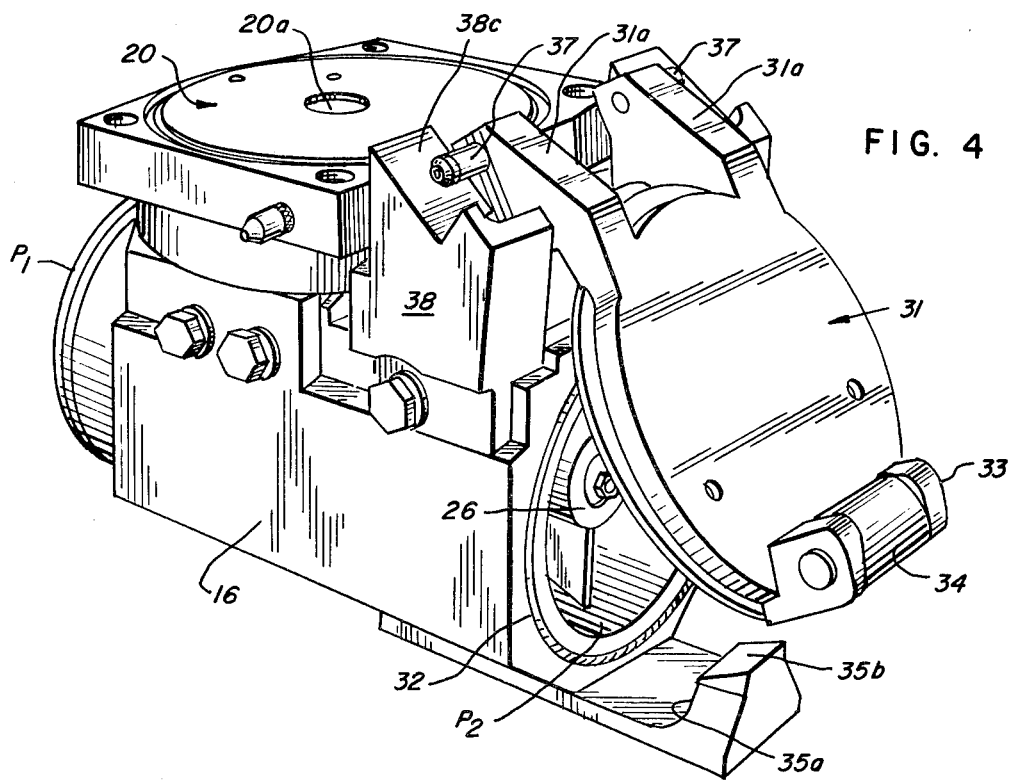
FIG. 4 is similar to FIG. 3 but with the partition of the secondary passageway in place and showing the pressure responsive second valve in an open position.
Figure 5:
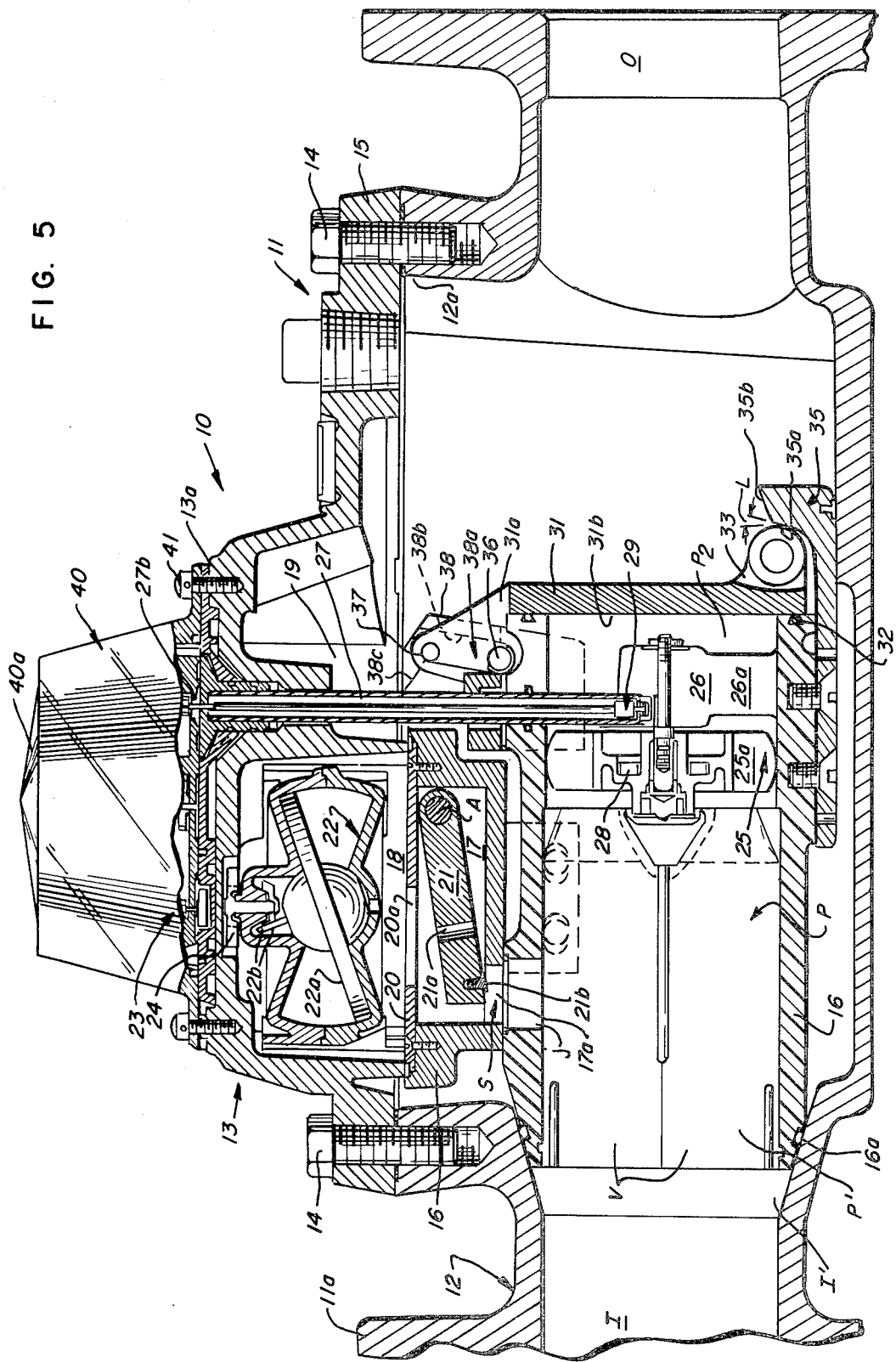
FIG. 5 is an enlarged, fragmentary vertical sectional view of the assembly of FIG. 1 with the flow responsive first valve of the secondary passageway shown in an open position and the pressure responsive valve in a closed position.
Figure 6:
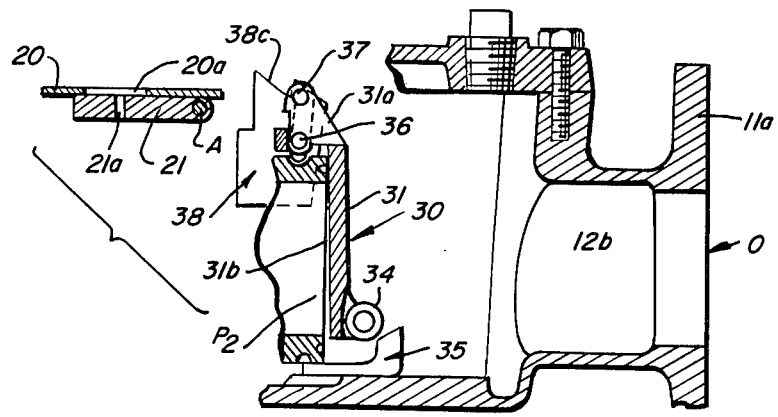
Figure 7:
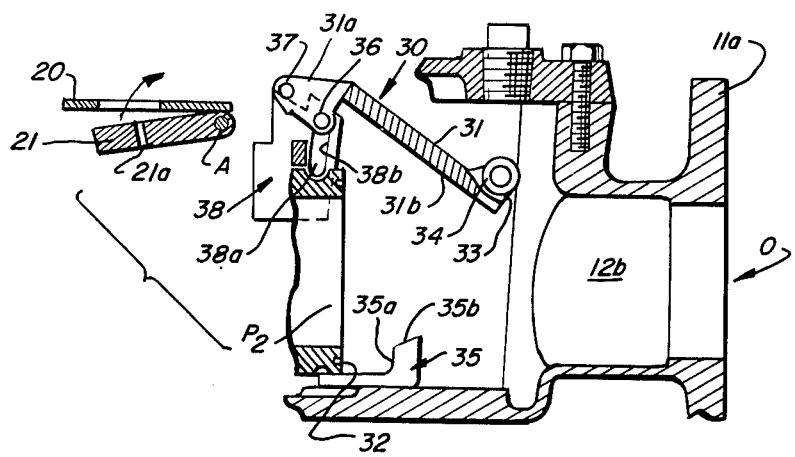
Figure 8:
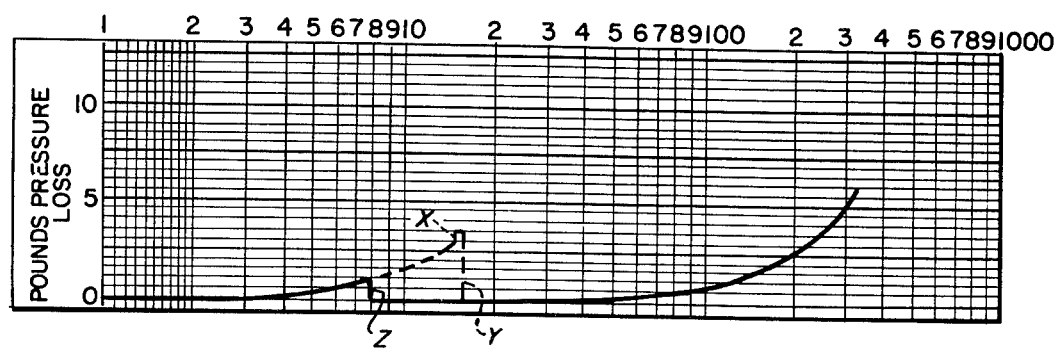
Figure 9:
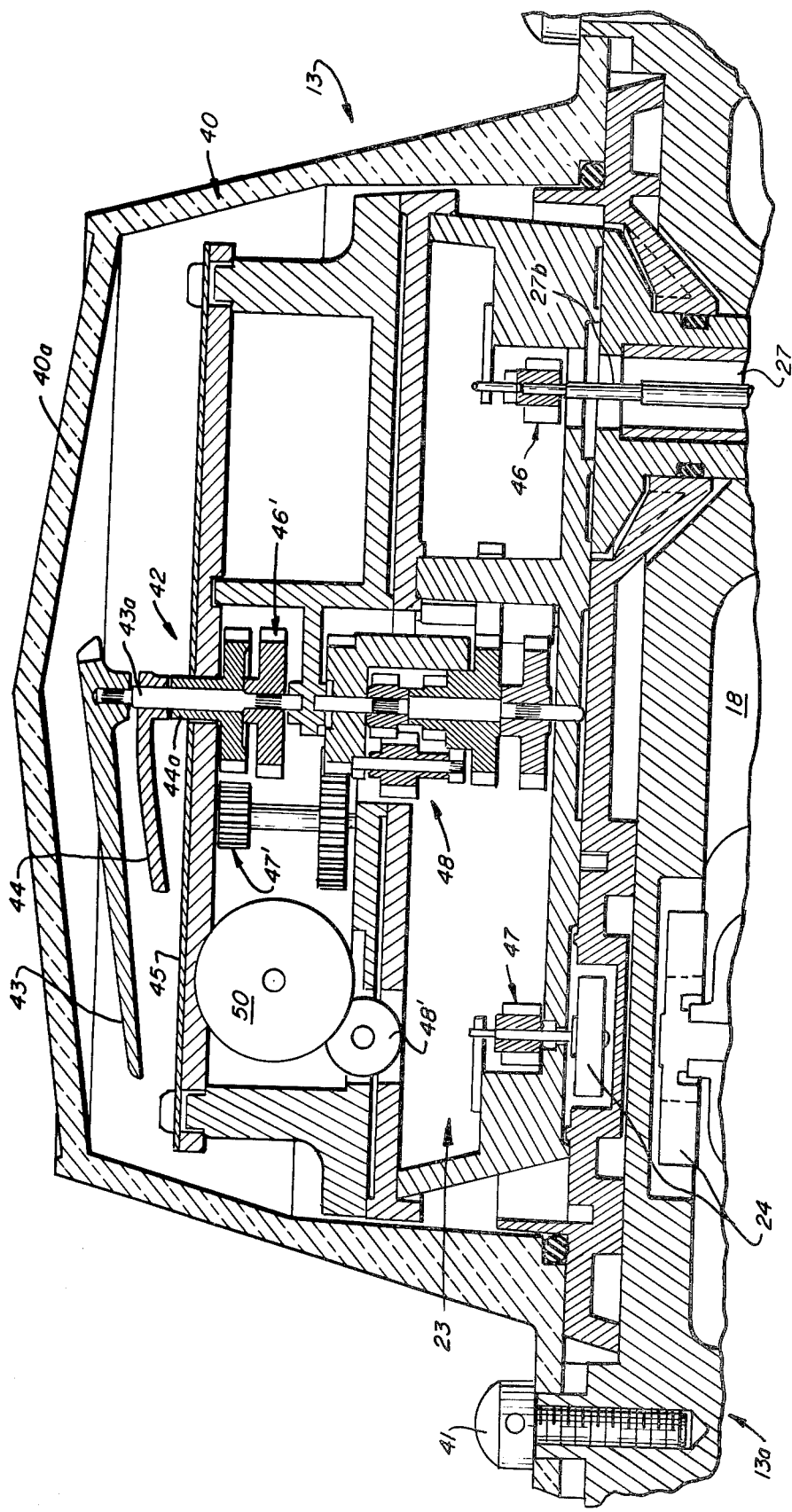
Figures 10, 11:
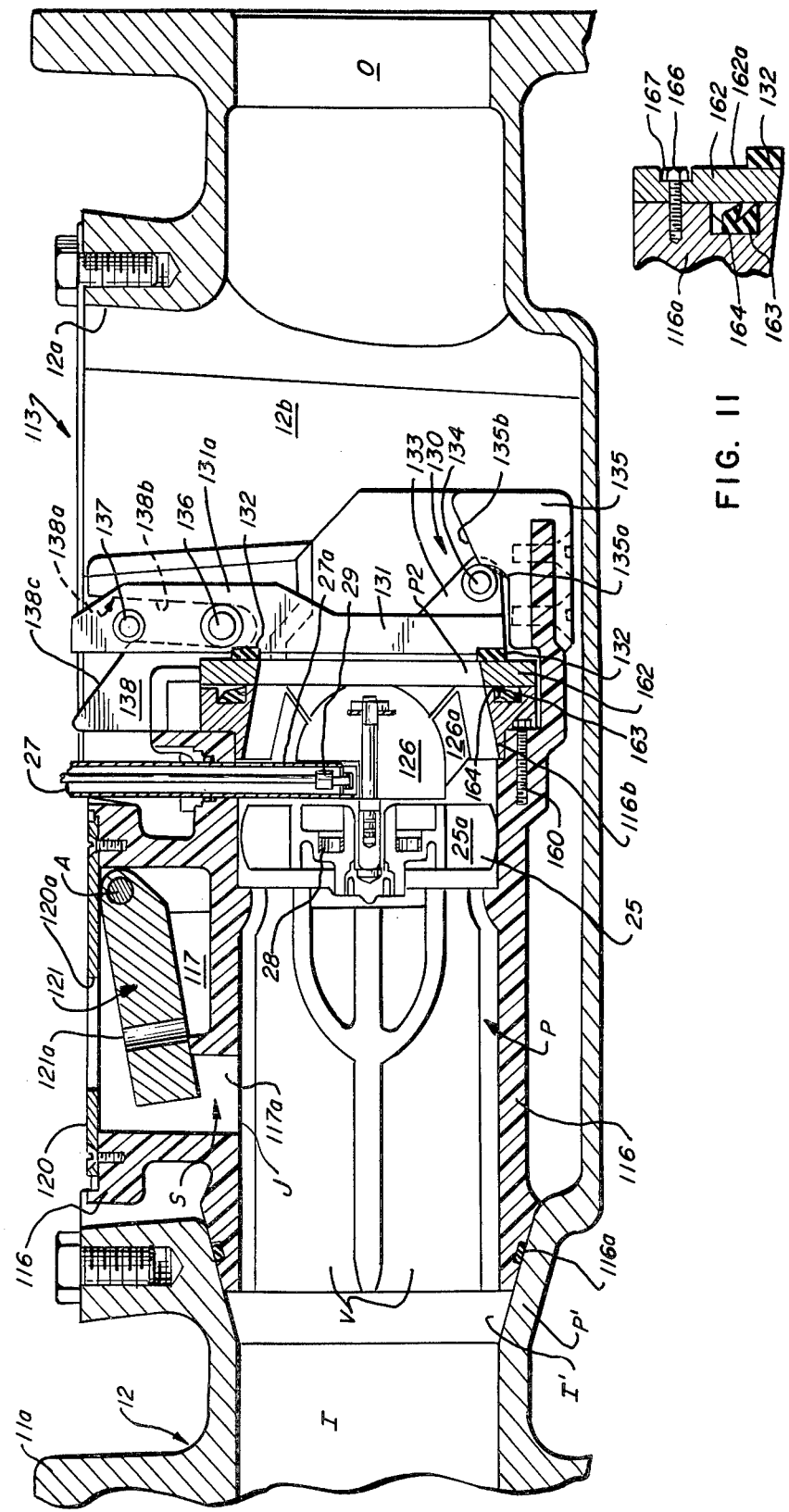

FIGS. 6 and 7 are fragmentary vertical sectional views of the valves within the primary and secondary passageways and showing the relative positions of adjustment of the valves during initial substantial closing of the valve in the secondary passageway and initial releasing of the other valve from its wedged or fully closed position (FIG. 6), and then the movement of the latter valve to its fully opened position (FIG. 7);

FIG. 8 is an illustrative graph of the pressure loss versus rate of flow characteristics of the subject meter assembly;

FIG. 9 is an enlarged fragmentary vertical sectional view of one form of the data reading means shown in FIG. 2;

FIG. 10 is a fragmentary vertical sectional view similar to FIG. 5 of a modified meter assembly corresponding to the assembly of FIG. 4; and FIG. 11 is a fragmentary, enlarged, vertical sectional view illustrating the mounting of the valve seat ring of the primary passageway valve shown in FIG. 10.

Figure 1:
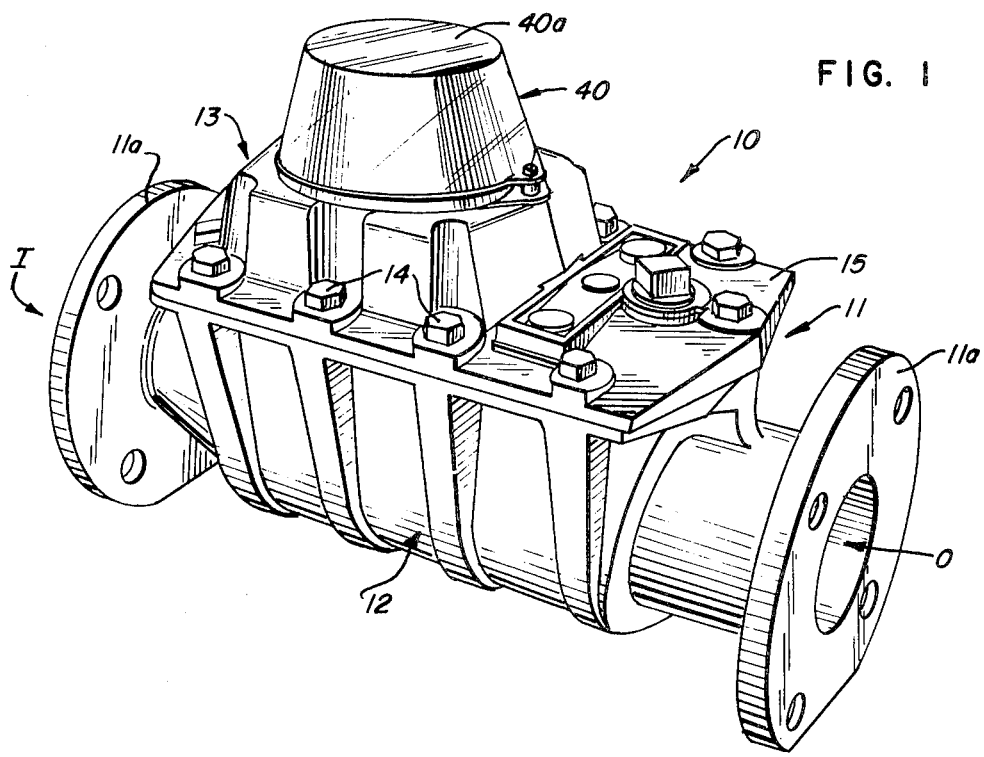
FIG. 1 is a perspective view of one form of the improved meter assembly removed from the piping system and showing the outlet side of the assembly.

Referring now to the drawings and more particularly to FIG. 1, an embodiment of the improved meter assembly 10 is shown. The assembly is adapted to be installed within a piping system, not shown, so as to accurately measure the variable liquid flow through the system. The improved meter assembly 10 combines conventional types of meters in such a way that very accurate measurements of flow rates are possible notwithstanding that the flow rate varies substantially. The low flow rate meter is a positive displacement meter 22 of the nutating disc type, and the high flow rate meter 25 in an inferential meter of the axial flow turbine type. The particular embodiment illustrated and described below was designed for use in a 3" diameter piping system, and also is suitable for use in a 2" system by variation of the outer housing to provide connecting flanges suitable to the 2" system. Of course, a wide variety of sizes of corresponding units may be provided for other piping systems.

As seen in FIGS. 1 and 2, assembly 10 is a compact unit and includes a composite housing 11 having an inlet I and an outlet O formed therein. The inlet and outlet are each delimited by an exterior flange 11a which facilitates connecting the housing to adjacent sections of the piping system. The housing 11 is provided with a hollow, open-topped first section 12 in which is removably mounted a second section 13. The sections 12 and 13 are retained in assembled relation by suitable fastening means 14. Second section 13, as illustrated in FIG. 2, includes a cover plate portion 15 which is sized so as to overlie and close-off the open upper side 12a of housing section 12.

Depending from the underside of cover plate portion 15 is a carriage 16, which has formed therein a primary passageway P and a secondary passageway S, see FIG. 5. The primary passageway P has a substantially rectilinear, elongated configuration and is adapted to be axially aligned with and in direct communication with the housing inlet and outlet when sections 12 and 13 are in assembled relation. As seen in FIG. 5, the inlet and outlet and the flanges 11a delimiting same are formed on the housing section 12. The upstream end P' of passageway P may have a tapered exterior configuration which is disposed in sealing engagement with an interior surface I' surrounding inlet I, as at an O-ring 16a, when section 13 is assembled with section 12.

Disposed a short distance downstream from inlet I is the juncture J between the secondary and primary passageways S and P. Initially the secondary passageway S extends upwardly therefrom at substantially a right angle from juncture J, see FIG. 5. Passageway S, however, is tortuous and of non-uniform configuration and includes a port 17a, a first cavity 17, an enlarged second cavity 18 disposed thereabove and separated therefrom by a partition 20 which has a port 20a formed therein, a further port, not shown, which communicates with cavity 18 and an upper interior portion 19 of the section 13. Upper interior portion 19 communicates with a portion 12b formed in section 12 and disposed adjacent the outlet O. In the illustrated embodiment, port 20a is offset relative to the port 17a.

Located within cavity 17 is a hinged valve 21 which is mounted for pivotal movement about a substantially horizontal axis A. Valve 21, under certain conditions, serves as a trigger for a second valve 30 located in the primary passageway P in a manner to be hereinafter described. Valve 21 is responsive to the liquid flow through the passageway S so that when the flow therethrough from junction J to chamber 18 is increasing and exceeds a predetermined rate (e.g., 17 g.p.m.), the valve 21 will automatically pivot from an open or down position, see FIG. 5, to an up or substantially closed position relative to the port 20a, see FIG. 6. Such responsiveness of the valve 21 is provided by relating the flow restriction therepast to the force required to effect substantial closing of the valve. In the preferred embodiment the opening force on this valve is merely the weight of the valve itself (e.g., 773 grams); hence the force required to move the valve to its up position is that required to lift this weight against gravity in pivoting the element about horizontal axis A.

Valve 21 is provided with a restricted opening 21a or some other means through which a small amount of liquid will continue to flow even when the valve has assumed an up or substantially closed position and the remainder of the liquid flow has been diverted to the primary passageway P. The small flow through, or around, valve 21, when it is in its up position, prevents sediment accumulation and related sticking of the components embodied in the low flow rate meter 22, the latter being located within cavity 18, and also provides pressure communication to facilitate reopening of the valve 21 after closure. A resilient bumper 21b may be attached on the underside of valve 21 to cushion its opening stroke.

Meter 22 is preferably a conventional nutating disc type, such as disclosed in U.S. Pat. No. 3,248,583. Meter 22 is a positive displacement meter and thus is particularly suitable for accurately measuring low rates of liquid flow (e.g., less 17 g.p.m.). This meter includes a disc 22a the nutating movement of which is transformed into rotary movement through a drive spindle 22b connected to the disc. The rotary movement is then transmitted through a magnetic coupling 24 to a data reading mechanism 23 such as a register, which is positioned on the upper exposed portion 13a of the housing section 13, see FIG. 5. The operation and structural details of the mechanism 23 will be discussed more fully hereinafter.

Disposed within primary passageway P and downstream from the juncture J of the passageways S and P is a meter 25 which is particularly suited for accurately measuring high flow rates (e.g., above 7 g.p.m.). This meter may be of a conventional axial flow turbine type, of which one recent improved example is disclosed in U.S. Pat. No. 3,972,233. Meter 25 includes a turbine wheel or impeller 25a supported within the passageway P by a stationary retainer hub 26 mounted on struts 26a so that the rotary axis of the impeller is substantially horizontally disposed and coaxially aligned with the primary flow passageway. In an effort to minimize turbulence within the primary passageway and thereby improve the accuracy of meter 25, a plurality of radial, inwardly projecting flow straightening vanes V may be provided which are arranged symmetrically about the rotary axis and disposed upstream of the impeller 25a.

The rotational movement of the impeller 25a is transmitted to an upright elongated shaft 27 through a magnetic coupling which includes a multi-pole annular magnet 28 mounted on the impeller and an annular multiple pole magnet 29 secured to the shaft 27. The magnet 28 is disposed within hub 26. Shaft 27 is adapted to rotate about its longitudinal axis and the lower end 27a of shaft 27 is supported by a suitable thrust bearing. The upper end 27b of shaft 27 is connected by a suitable coupling to the data recording mechanism 23.

Located downstream of meter 25 and disposed at the outlet end $P_2$ of primary passageway P is a valve 30 which includes a relatively heavy (e.g., about 1400 grams) plate-like door member 31 mounted so as to normally assume a substantially vertical, closed position when the flow rate past meter 25 is below a predetermined minimum (e.g., 17 g.p.m. when the flow is increasing and 7 g.p.m when the flow is decreasing). When member 31 is in its closed position, as seen in FIG. 5, the upstream surface thereof is in sealing engagement with an annular seal 32 which delimits the downstream end $P_2$ of the primary passageway P.

Figure 3:
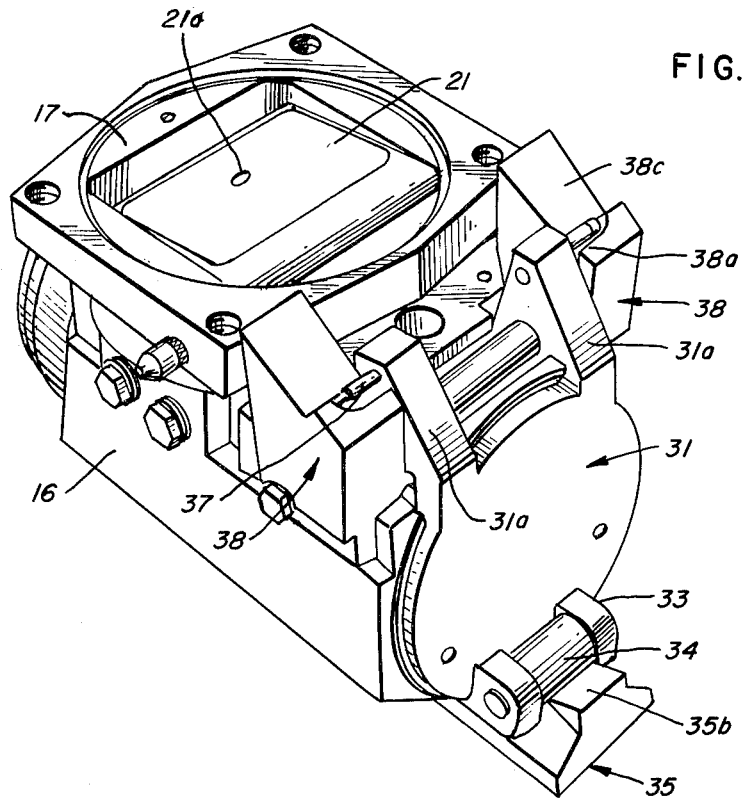
FIG. 3 is similar to FIG. 2 but with the data reading means removed and the flow rate meter, cover plate and partition removed from the secondary passageway and showing the pressure responsive second valve, located in the primary passageway, in a closed position.

Formed on door member 31, adjacent the lower edge thereof and extending downstream therefrom is a bracket 33 on which is mounted a transversely extending slide roller or the like 34. When the door member is in its fully closed position, as seen in FIGS. 3 and 5, the lower edge portion thereof including the bracket 33 and roller 34 is wedged between a stationary member 35, disposed downstream of the passageway end $P_2$, and a lower portion of the seal 32. The wedging effect is produced by a cam surface formed on member 35 which is engaged by the roller 34. The cam surface includes a steeply inclined segment 35a (e.g., approximately 8° from the vertical, as indicated at angle L), and a more gradual inclined segment 35b (e.g., approximately 35° from the horizontal) extending upwardly and in a downstream direction from the upper edge of segment 35a. The uppermost portion of segment 35a is engaged by roller 34 when the door member 31 is fully closed. Segment 35b may be engaged by roller 34 either subsequent to the door member 31 being released from its wedged position or just prior to the door member moving to its wedged or fully closed position.

Disposed on bracket portions 31a, the latter being positioned at opposite sides of the upper marginal portion of door member 31, are pairs of laterally extending guide rollers 36 and 37. Rollers 37 are vertically spaced relative to rollers 36, as seen more clearly in FIG. 5. The rollers 36, 37 are adapted to engage stationary guides 38 of like construction, which are provided in the carriage assembly 16 above the outlet end $P_2$ and adjacent opposite sides of member 31. Each guide 38 is provided with a slot 38a open at its upper end for receiving rollers 36 and 37. The slot 38a has a downstream side 38b inclined downwardly and inwardly towards seal 32 and at a steep angle, generally parallel to the surface 35a of bracket 35 (e.g., approximately 8° to the vertical). Each surface 38b is engaged by the respective roller 36 when the door member 31 is fully closed as in FIGS. 3 and 5. At the upstream side of the slot adjacent the upper end thereof each guide 38 is angularly disposed and forms a ramp-like surface 38c which is engaged by roller 37 for supporting the door member 31 when the door is in its fully opened position as seen in FIG. 7.

Door member 31, as aforementioned, is relatively heavy and formed of a noncorrosive material. When the door member 31 is opened it is pivotally supported and guided by the rollers 36 and 37 engaging the guides 38. When the flow rate through passageway P diminishes and goes below a certain amount (e.g., 7 g.p.m.), gravity will overcome the dynamic impact of the flowing fluid on the door member and the pressure drop across the door member opening and thus will cause the door member to move from its open position toward its fully closed position as seen in FIG. 5. The door member 31 is subjected to a combination of sliding and pivoting action as it moves between fully open and fully closed positions. Because the ramp surfaces 38c are engaged by rollers 37 and roller 34 engages cam surface segment 35a, a wedging action is effected to provide a strong amplified closure force for seating the door member on the seal 32 against the pressure drop between inlet I and outlet O at the fully seated or closed position, see FIGS. 3 and 5. Because of the aforenoted wedging action, which is effected only at final closure, the seating force substantially exceeds the forces tending to close the door member against the flow during the remainder of its opening excursion. This assures a step function force change during the closure locking and particularly during the unlocking and opening, as distinguished from the force changes proportionally related to the changes in flow rates.

In installing the illustrated assembly 10 within a piping system, it is important that the axis of the primary passageway P and the axes of rollers 34, 36 and 37 be disposed in substantially horizontal planes so that the flow responsive valves will operate properly in the manner described. In addition, it is also important that axis A of valve 21 be horizontally disposed.

In order to release the door member 31 from its wedged position, the upstream surface 31b thereof must be subjected to a sudden pressure impulse of sufficient magnitude to overcome the weight of the door member itself and the wedge friction between the roller 34 and cam surface segment 35a. The necessary pressure impulse momentarily occurs when valve 21 pivots to its up position. The occurrence of the pressure impulse is shown graphically in the chart of FIG. 8. The chart discloses a representative pressure loss across the assembly 10, the latter being designed for use with a three inch piping system, which has been plotted against rate of flow in gallons per minute. In the chart, the solid line represents the conditions during closing of the valve 30, whereas the dashed line represents the conditions during opening of that valve.

The operation of the meter 10 will be described with particular reference to the chart of FIG. 8. Assuming an initial condition of no-flow or a very low flow rate, the valve 21 will be open or in its down position and the valve 30 will be closed as in FIGS. 3 and 5. Under these conditions, flow will occur through secondary passage S and be registered on the read-out mechanism 23 by the meter 22. As the flow rate increases through the secondary passageway and reaches approximately 17 g.p.m., a pressure drop will develop which causes valve 21 to move to its up, or triggering, position of FIG. 6. At this condition, flow through the meter 22 is momentarily interrupted and a substantial pressure drop is created between the inlet I and the outlet O producing a sudden pressure impulse, represented by a spike or pulse X on the chart. The pressure impulse is exerted on the upstream surface 31b of member 31 and is of such magnitude as to impart a resultant upward force component at the steep angled interface of rollers 34, 36 with surfaces 35a, 38b, respectively, which will be sufficient to release the door member 31 from its wedged position (see FIG. 6). Once the door member 31 has been released from its wedged position, it will react to the diverted liquid flow and move to its fully open position (see FIG. 7) by pivotal movement on the rollers 37 while the latter are in engagement with ramp surfaces 38c. When door member 31 opens, thereby establishing flow through the primary passage and through meter 25, there is a prompt drop in pressure loss across the assembly nothwithstanding that the flow rate continues to increase. This is illustrated by the vertical dash line Y on the chart. With this drop, valve 21 again opens. Thereafter flow continues through both meters. However, the rate of flow is more than adequate to insure that the meter 25 will start promptly and will be operating within its range of acceptable accuracy of flow measurement. It is not until the flow rate through the assembly exceeds approximately 150 g.p.m. that there is once again any appreciable pressure loss across the assembly. In this high flow range of operation, the valve 21 again will close and prevent any overspeed operation of the meter 22 as the pressure drop increases. As aforenoted, the slow flow permitted by opening 21a will provide continuous flushing of the meter 22 and thus prevent "freezing" of this meter from sedimentation or from nonoperation over extended periods of high flow rates through the meter assembly 10.

As the flow through the meter assembly diminishes below the high flow cutoff, e.g., 150 g.p.m., valve 21 will open and thereafter remain open while the door member 31 moves towards its closed position. The member 31 will automatically resume its closed position when the flow rate reaches approximately 7-8 g.p.m. as represented by the vertical line Z on the chart. The flow rate at which member 31 moves to a position where rollers 36 pass off of ramp surfaces 38c and roller 34 clears surface 35b is well below the flow rate which would normally cause door member 21 to reclose. Thus, when door member 31 reaches its wedge closure position defined by surfaces 35a and 38b, it will promptly and firmly drop to its fully-seated, closed position. The disposition of the door member 31 in a wedged condition when it is in a fully closed position avoids leakage flow through the primary passageway. Valve 21 will maintain its open position during this downward cross-over of metering operations, and valve 30 will not reopen until such time as the flow rate again reaches the higher flow rate for cross-over under increasing flow rate conditions. Thus the opening conditions are significantly different (higher flow rate and pressure drop) than the closing conditions. Because door member 31 opens only when the flow through the assembly has increased to a significantly higher flow, e.g., approximately 17 g.p.m., and then resumes its closed position when the flow through the assembly has diminished to a lower flow, e.g., approximately 8 g.p.m., the annoying problem of valve oscillation or "chatter" is avoided.

A positive displacement meter such as is used in the secondary passage provides highly accurate metering at very low flows. The trigger valve 21 in the secondary passageway controls the opening of valve 30. Since the meter 25 is brought into service only within flow rates at which it has good measuring accuracy, very accurate measurement of flow is obtained over a very wide range of flow rates with the meter assembly 10. For example, it has been found that the accuracy of the meter assembly 10, when used in a 3" diameter piping system, can be maintained between ±1½% for flow rates of from 2.5 g.p.m. to 350 g.p.m. During the cross over period during which the flow is diverted from one passageway to the other, the accuracy of the assembly remains substantially the same, namely ±1½%.

FIG. 9 discloses one embodiment of the data reading mechanism 23 forming a part of the improved assembly 10. The mechanism 23 includes an inverted cup-shaped casing 40 having at least the upper surface 40a thereof transparent. The casing is secured by register fasteners 41 to the upper exposed portion 13a of the housing section 13. Disposed within casing 40 is a first gauge 42 which includes a pair of pointers 43 and 44 adapted to pivot about a common axis, and a composite calibrated dial face 45 associated therewith. Pointer 43 is connected to the upper end of a spindle 43a which is rotatable about its axis and is actuated by rotating shaft 27 through a gear train 46-46' of a conventional type and only partially shown in FIG. 9. Thus, pointer 43 indicates the flow rate through the primary passageway P. Pointer 44, on the other hand, is connected to a rotatably mounted sleeve 44a, which, in turn, is connected by a gear train 47-47' of a conventional type and also only partially shown in FIG. 9, to the magnetic coupling 24 associated with the nutating disc 22a of meter 22.

The movements of pointers 43 and 44 are integrated by a suitable summing differential 48-48', partially shown in FIG. 8, into a totalizer 50 such as a conventional odometer counter. The reading of counter 50 may be readily observed through the transparent portion 40a of casing 40.

The summing differential 48-48', which may be of a conventional mechanical type, is continuously connected to meters 22 and 25, through gear trains 46 and 47, and to the odometer 50. Such continuous connection is possible because each meter is in operation only within a flow range at which it provides accurate metering. Thus, any need for separate registers or for selective connection or disconnection of registering inputs from the two individual meters is avoided.

Various forms of data reading means may be utilized and will depend upon the size of the assembly and information or measurements sought from the assembly. The relative location and size of the primary and secondary passageways may be varied from that shown without departing from the scope of the invention.

It will be noted that the meters and the data reading means are mounted on and carried by housing section 13 which may be readily removed from housing section 12 while the latter remains connected to the piping system. When section 13 is removed for repair and/or calibration, the open upper side 12a of section 12 may be closed by a suitable plate, not shown, so that flow through the piping system can be resumed. By reason of section 13 being removable, on site replacement of section 13 can be readily accomplished.

FIG. 10 illustrates a modified housing section 113 which is removably mounted within housing section 12. In illustrating and describing section 113 the same identifying letters and numerals, but in the 100 series, are applied to the elements thereof which correspond to those of section 13. Thus, such elements are not further described hereafter, except as is necessary to highlight the modified structure embodied in section 113.

Generally, section 113 is modified to provide an improved seating action of the door member 131 of valve 130 with respect to the seal 132, and to permit the major portion of the casing 116 to be formed as a unitary molding, preferably of a suitable plastic which is inert to the liquid flowing through the piping system. Thus by reason of the molded casing 116, the cost of materials and the cost of manufacture are greatly reduced, and the overall weight of the assembly 110 is significantly less than with prior meters.

In section 113, the hub 126 and struts 126a are made integral with a housing ring 116b which is joined to the casing 116 by suitable fasteners 160. An annular floating seat plate 162 is provided which abuts a chevron-type annular seal 163 disposed in a recess 164 formed in the downstream face of the ring 116b, see FIG. 11. The seating ring 162 is movably supported on the ring 116b by fasteners 166 which pass through openings 167 formed in the ring 162 and engage the ring 116b as shown in FIG. 11. Openings 167 are of a size and configuration to permit lateral and axial adjustment of ring 162 with respect to ring 116a. A further annular seal 132 is attached to the downstream face 162a of the ring 162 for sealing abutment by the door member 131 of valve 130.

The bracket 135 and stationary guides 138 are separate components which may be formed of brass or stainless steel, and are suitably attached to casing 116 in the positions illustrated. The guides 138 are disposed such that the slots 138a thereof are generally in vertical alignment with the door member 131. The bracket portions 131a of door member 131 are correspondingly modified from the angular configuration they assume in assembly 13.

The operation of a compound meter utilizing the assembly 113 is the same as that described above with respect to the embodiments of FIGS. 1-7. However, the modified seating arrangement for the door member 131 provides greater flexibility of the valve seat and hence a more consistent closure seal. For this reason and for the benefits derived from the unified molded construction, the design of FIG. 10 is a preferred embodiment.

It will be noted that a meter assembly has been provided which is of simple and compact construction; is capable of accurately measuring liquid flow over a wide range of flow rates; provides straight-line flow in the main flow stream with minimal pressure loss; effects switching by a triggering action in the secondary flow path; reduces the requirements of mass for the closure in the main flow stream; is easily serviced and maintained; and is not susceptible to harmonic oscillation or valve "chatter" when in operation.

While particular embodiments of this invention have been shown, it will be understood, of course, that the invention is not limited thereto since many modifications may be made by those skilled in the art, particularly in light of the foregoing teachings. Therefore, it is contemplated by the appended claims to cover any such modifications as incorporate those features which may be said to constitute the essential features of these improvements within the true spirit and scope of the invention.

What is claimed is:

1. A method of regulating and measuring fluid flow comprising the steps of:

directing fluid into an assembly having first and second flow paths with inlets in fluid communication with one another and first and second valve means disposed in said first and second flow paths respectively such that said first flow path is at least partially open and said second flow path is closed by said second valve means at a low rate of flow of said fluid through said assembly, said second valve means being held closed with a predetermined locking force;

substantially precluding fluid flow through said first flow path by substantially closing said first valve means when the rate of fluid flow through said first flow path increases to a first predetermined rate thereby causing an abrupt increase in the pressure differential acting on said closed second valve means;

utilizing only said increased pressure differential to overcome said predetermined locking force and open said second valve means, thereby opening said second flow path; and closing said second flow path by closing said second valve means only when the fluid pressure differential thereacross due to the rate of flow therethrough diminishes to a pressure differential substantially lower than the pressure differential thereacross at said first flow rate prior to closure of said first valve.

2. The method of claim 1 wherein said closure of said second valve means is effectuated by applying a first closure force to said second valve means when in an open position which is proportionally related to the flow rate therethrough, and applying a step function closure force increase during final closure and seating of said second valve.

3. The method of claim 1 including the step of substantially reopening said first flow path by gravitationally reopening said first valve means when the fluid pressure differential thereacross diminishes below the pressure differential thereacross at which said first valve closes.

4. The method of claim 1 including the step of measuring fluid flow through said first fluid flow path with a first fluid flow meter disposed in said first fluid flow path.

5. The method of claim 1 or 4 including the step of measuring the fluid flow through said second flow path with a second fluid flow meter disposed in said second flow path.

* * * * *